United States Patent
Byrd

[11] 3,931,532
[45] Jan. 6, 1976

[54] THERMOELECTRIC POWER SYSTEM

[75] Inventor: Ambrose W. Byrd, Huntsville, Ala.

[73] Assignee: The United States of America as represented by the United States National Aeronautics and Space Administration, Washington, D.C.

[22] Filed: Mar. 19, 1974

[21] Appl. No.: 452,769

[52] U.S. Cl. .................. 310/4; 136/202; 136/210; 165/105
[51] Int. Cl.² .......................... G21H 1/10
[58] Field of Search ........ 310/4; 136/200, 202, 210; 165/105; 322/2

[56] References Cited
UNITED STATES PATENTS

| | | | |
|---|---|---|---|
| 3,302,042 | 1/1967 | Grover et al. | 310/4 |
| 3,378,449 | 4/1968 | Roberts et al. | 165/105 X |
| 3,437,847 | 4/1969 | Raspet | 310/4 |
| 3,441,752 | 4/1969 | Grover et al. | 310/4 |
| 3,451,641 | 6/1969 | Leventhal | 310/4 X |
| 3,509,386 | 4/1970 | Byrd | 310/4 |
| 3,535,562 | 10/1970 | Byrd | 310/4 |
| 3,537,515 | 11/1970 | Byrd | 310/4 X |
| 3,607,631 | 9/1971 | Hobson et al. | 310/4 X |
| 3,709,781 | 1/1973 | Fiebelmann et al. | 165/105 |
| 3,801,446 | 4/1974 | Sparber et al. | 136/202 X |

Primary Examiner—Donovan F. Duggan
Attorney, Agent, or Firm—George J. Porter; L. D. Wofford, Jr.; John R. Manning

[57] ABSTRACT

A thermoelectric power system particularly adaptable for use in outer space in which a nuclear reactor heats a working fluid, which in turn supplies heat to a plurality of thermoelectric generators spaced about a ring-shaped support. A first heat pipe is employed to couple heat between the hot fluid and hot junction of the thermoelectric element of each generator, and a second heat pipe couples heat away from the cold junction of each thermoelectric element. Each of the second heat pipes are elongated flexible units adapted to be folded upon launch of the system of a space vehicle and thereafter extended in space to provide a substantial area of radiation of heat to be discharged.

7 Claims, 2 Drawing Figures

THERMOELECTRIC POWER SYSTEM

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to thermoelectric power systems and particularly to a system of this category adapted for employment in outer space.

2. General Description of the Prior Art

A previous system for producing power in outer space with thermoelectric elements employed two liquid loops. In one, a heated fluid was circulated to provide heat to a hot junction of a thermoelectric element, and in the other, a coolant fluid was circulated to engage and carry heat away from the cold junction of the thermoelectric element. Several difficulties were experienced with the system. The system was quite complex with each power module of the system consisting of 20 thermoelectric elements. Pumps were required in both heating and cooling loops. The power modules were massive because of the number of elements, resulting in high launch stresses and requiring heavy restrainers. Thermal gradients existed in both the hot and cold coolant loops, preventing thermoelectric elements from each producing the same amount of electrical energy. The thermal gradients also produced thermal stresses resulting in structural failures.

It is, accordingly, an object of this invention to provide an improved thermoelectric power system for use in outer space which is more effective, more efficient, and of lighter weight for the same power generation capability than prior systems.

SUMMARY OF THE INVENTION

In accordance with the invention, a thermoelectric power system is constructed wherein a first heat pipe receives heat from a hot fluid and conveys the heat to the hot junction of a thermoelectric generator. The cold junction of the thermoelectric generator is surrounded by a second and larger heat pipe which receives heat from the cold junction and discharges the heat by radiation from the exterior surface of the second heat pipe. Typically, such a system would be employed wherever radiation of heat would be the most effective means of discharging heat, such as would be the case of operation in outer space.

DESCRIPTION OF THE PREFERRED EMBODIMENT

Figure 1:
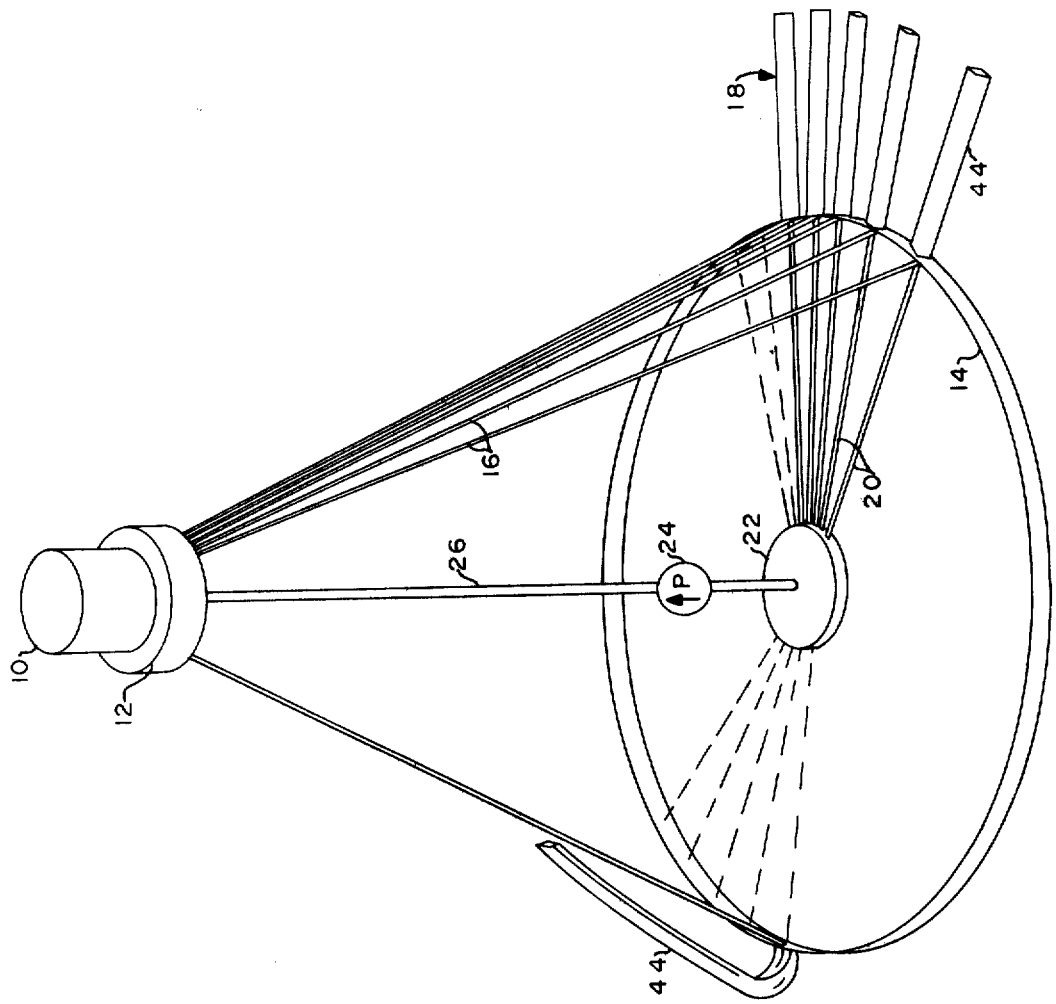
FIG. 1 is a pictorial view of the general arrangement of components in the embodiment of the invention.

Referring initially to FIG. 1, nuclear reactor 10 (or other source of heat) is centrally mounted upon a cylindrical coolant plenum chamber or reservoir 12. Coolant reservoir plenum chamber 12 is heat coupled to atomic reactor 10 by means not shown, and it functions to heat the working fluid of the system, typically liquid sodium and potassium (NaK). An array of thermoelectric power generating units are mounted on support ring 14, in turn attached to coolant plenum chamber 12 by a plurality of fluid lines 16. Fluid lines 16 provide mechanical support between heat exchanger 12 and thermoelectric generating units 18, and each line 16 provides a passageway for a hot fluid to be supplied to the thermoelectric generating units for the generation of power. After releasing heat to a thermoelectric generating unit, fluid flows through discharge line 20 to sump 22. From sump 22 the fluid is recirculated by electromagnetic pump 24 through line 26 to plenum chamber 12 where it is reheated and the fluid cycle repeated, whereby all of the thermoelectric generating units are continuously supplied heat to thus provide a continuous source of electrical power. Line 26 and lines 16 provide mechanical support which function with lines 20 to rigidly connect power units of the system together. If the power system is to be man rated, plenum chamber 12 would be replaced with heat exchangers at the expense of extra pumping power and mass.

Figure 2:
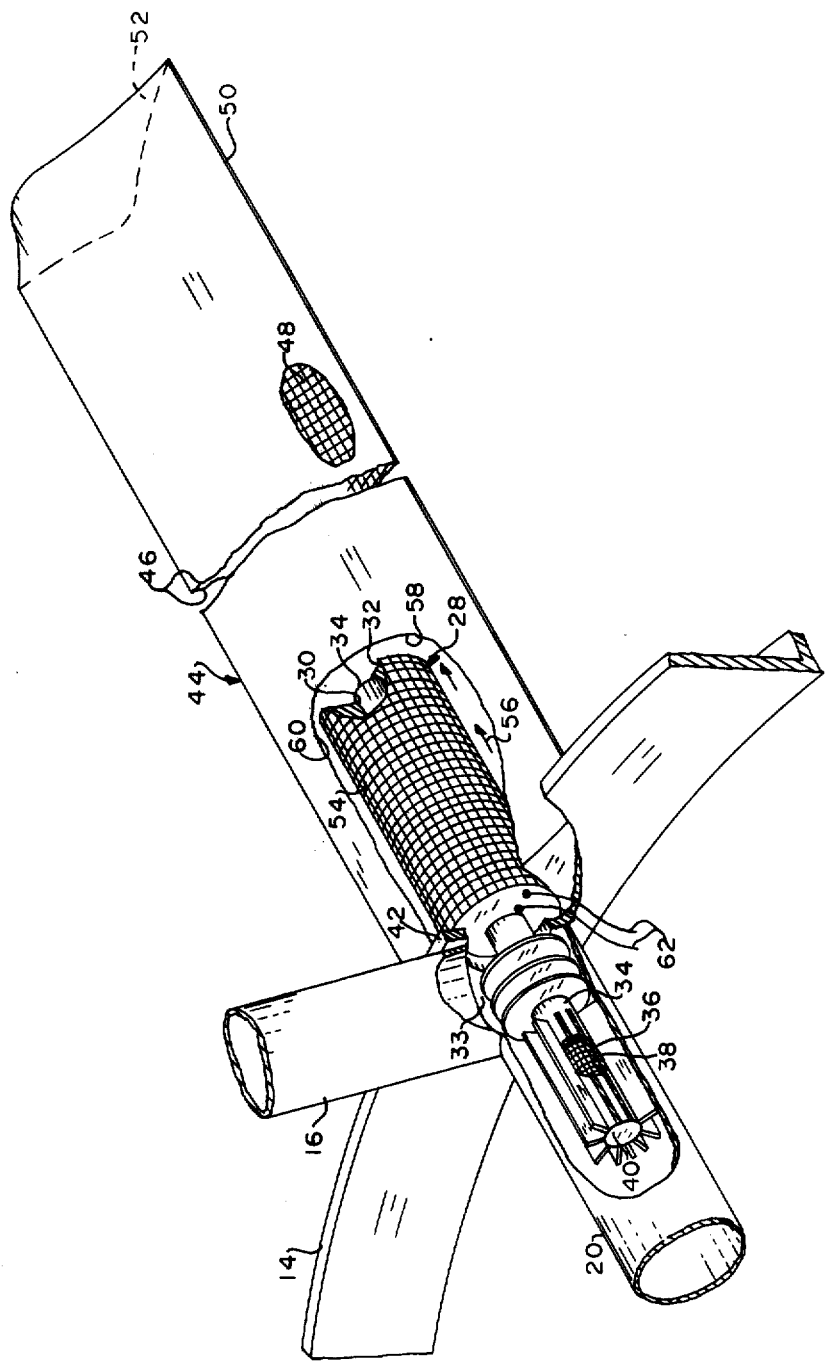
FIG. 2 is a pictorial view, with a portion broken away, of a thermoelectric generating unit as contemplated by this invention.

FIG. 2 illustrates the details of one of the thermoelectric generating units. Power generation is by means of a thermoelectric element 28 of a known type responsive to heat being applied to a hot junction 30 and discharged from a cold junction 32. The heated fluid enters a chamber 33 formed at the intersection of pipes 16 and 20 and having been conducted through lines 16 to heat pipe 34, and then by heat pipe 34 to hot junction 30 of thermoelectric element 28. Heat pipe 34 is generally conventional in construction and encloses a wick 36 about its inner periphery 38 which extends the length of the pipe. The heat pipe contains a heat transfer fluid, typically mercury. Heat is absorbed in end region 40 of pipe 34, causing the mercury to vaporize and move under expanding pressure to the right along the length of heat pipe 34, giving up its latent heat to heat the hot junction 30 of thermoelectric element 28. This loss of heat causes the mercury to condense, and by means of capillary flow, returns along peripheral internal wick 36 to end region 40 of heat pipe 34 where it is again reheated and the cycle repeated.

Thermoelectric generating unit 28 is supported by virtue of a wall region 42 of ring 14, wall region 42 being attached to and surrounding heat pipe 34 in a manner which provides a fluid seal between chamber 33, the region housing the left portion of heat pipe 34, and a second heat pipe, flexible heat pipe 44, which serves to discharge heat from cold junction 32 of thermoelectric element 34.

Flexible heat pipe 44 is formed from two thin elongated nichrome sheets 46, to the inner sides of which are welded layers of screen wire mesh 48. The nichrome sheets are formed into trough-like members which are welded along mating longitudinal edges 50. The outer end of heat pipe 44 is fitted with a solid head or a closed wall 52 which is sealably welded to longitudinal members 46. A typical working fluid for this heat pipe is potassium, and it is heated and vaporized by heat from cold junction 32 of thermoelectric element 28. To facilitate this, the outer periphery of cold junction 32 is covered by a metallic wick 54. The vaporized potassium expands outward in the direction of arrows 56 and generally permeates pipe 44 under vapor pressure. Vapor is then condensed along the inner surface 58 of pipe 44, releasing heat which is radiated by the outer surface of pipe 44 into space. The condensate is then returned to end region 60 by capillary flow along wick 48 after which it is reheated and vaporized by thermoelectric element 28 and the cycle repeated. Electrical power output from each generating unit is obtained through power leads 62 which may be connected in series or in parallel with leads of the other thermoelectric generating units to provide a desired output voltage.

Referring back to FIG. 1, flexible heat pipe 44 would typically be folded during launch, as shown on the left side of the drawing, and then when the system is lifted out of the atmosphere, heat pipes 44 would be extended radially as shown on the right side of the drawing.

From the foregoing, it will be appreciated that the applicant has determined a significantly improved thermoelectric power system for use in outer space. It is compact, relatively light, and of a configuration particularly adaptable to be carried aloft by a space vehicle. It is extremely efficient in view of the heat pipe coupling in both the hot and cold junctions of the thermoelectric elements. It is particularly of note that in the employment of the heat pipe used as a heat radiator that no power is consumed in discharging heat from the cold junction of the thermoelectric element.

What is claimed is:

1. A thermoelectric power system comprising:
   a heat means having a fluid inlet and fluid outlet for receiving a fluid at said inlet, heating said fluid, and providing it as a heated fluid at said outlet;
   at least one thermoelectric generator assembly, each comprising:
     a fluid chamber having an inlet coupled to the outlet of said heat means and a fluid outlet, said chamber being heated by fluid from said heat means,
     first and second heat pipes, each comprising an elongated closed tube having a wick along the interior surface of said tube and containing a working fluid,
     a mounting means for sealably extending one end region of said first heat pipe into said chamber and the opposite end region of said first heat pipe into said second heat pipe,
     a thermoelectric element having a hot junction and a cold junction, said thermoelectric element being positioned within said second heat pipe and being positioned with its cold junction in engagement with said working fluid of said second pipe, and
     radiation means coupled to said second heat pipe for radiating into space heat absorbed by said second heat pipe from said cold junction of said thermoelectric element; and
   pumping means interconnecting said heat means and said chamber of each said assembly for pumping heated fluid from the outlet of said heat means through each said chamber and back to said heat means, whereby heat is transferred from said heat means by fluid flow to each said chamber, thence by said first heat pipe to a said hot junction, thence from said cold junction to said second heat pipe, and thereafter disposed of by radiation.

2. A thermoelectric power system as set forth in claim 1 wherein said radiation means comprises an outer surface of said second heat pipe.

3. A thermoelectric power system as set forth in claim 2 wherein said second heat pipe is flexible and foldable.

4. A thermoelectric power system as set forth in claim 3 comprising a plurality of said thermoelectric generator assemblies and further comprising:
   a supporting ring;
   mounting means for positioning said plurality of said thermoelectric generator assemblies upon and around said ring in spaced relation and wherein each said second heat pipe extends radially outward from said ring;
   supporting means for mounting said heat means at a point spaced from but along a line concentric with the center of said ring;
   a plurality of fluid couplers, each said fluid coupler being connected to said outlet of said heat means and to an inlet of a said chamber of one of said thermoelectric generator assemblies, whereby heated fluid is supplied individual said assemblies from said heat means;
   a sump centrally positioned with respect to said ring and having a plurality of fluid inlets and a fluid outlet, said fluid inlets being connected respectively to fluid outlets of said chambers, whereby fluid from said chambers may flow to said sump; and
   a pump coupled between the outlet of said sump and the inlet of said heat means whereby fluid collected in said sump from each of said chambers is pumped back to said heat means.

5. A thermoelectric power system as set forth in claim 1 wherein each said thermoelectric element is concentrically positioned on said first heat pipe.

6. A thermoelectric power system as set forth in claim 5 further comprising a plurality of fins attached to said first named end region of each said first heat pipe.

7. A thermoelectric power system as set forth in claim 6 wherein said plurality of fins comprises a first plurality of fins extending circumferentially around an inner portion of said end region of said first heat pipe and second plurality of fins extend longitudinally along an outer portion of said end region of said first heat pipe.

* * * * *